United States Patent
Ishikawa

(10) Patent No.: US 9,778,509 B2
(45) Date of Patent: Oct. 3, 2017

(54) OPTICAL CONVERSION MEMBER, BACKLIGHT UNIT, AND LIQUID CRYSTAL DISPLAY DEVICE

(71) Applicant: FUJIFILM Corporation, Tokyo (JP)

(72) Inventor: Hiroyuki Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/165,453

(22) Filed: May 26, 2016

(65) Prior Publication Data

US 2016/0274414 A1    Sep. 22, 2016

Related U.S. Application Data

(63) Continuation of application No. PCT/JP2014/081503, filed on Nov. 28, 2014.

(30) Foreign Application Priority Data

Nov. 28, 2013  (JP) ................. 2013-246010

(51) Int. Cl.
*G02F 1/1335* (2006.01)
*B82Y 30/00* (2011.01)
(Continued)

(52) U.S. Cl.
CPC ........ *G02F 1/133609* (2013.01); *B82Y 30/00* (2013.01); *C09K 11/02* (2013.01);
(Continued)

(58) Field of Classification Search
CPC ......... G02F 1/133617; G02F 1/133603; G02F 1/133609; G02F 1/133621;
(Continued)

(56) References Cited

U.S. PATENT DOCUMENTS 5,672,672 A * 9/1997 Amano ............... C08K 5/0025
                                                              385/143
7,985,607 B2    7/2011 Kim et al.
(Continued)

FOREIGN PATENT DOCUMENTS

JP    2009-263621 A    11/2009
JP    2009-545883 A    12/2009
(Continued)

OTHER PUBLICATIONS

International Search Report issued in connection with International Patent Application No. PCT/JP2014/081503 dated Mar. 3, 2015.
(Continued)

*Primary Examiner* — Nathanael R Briggs
*Assistant Examiner* — William Peterson
(74) *Attorney, Agent, or Firm* — Edwards Neils LLC; Jean C. Edwards, Esq.

(57) ABSTRACT

One embodiment of the present invention relates to an optical conversion member including an optical conversion layer containing a quantum dot emitting fluorescent light which is excited by incident excitation light, in which the optical conversion layer contains a quantum dot and polyorganosilsesquioxane, and an adjacent inorganic layer is directly in contact with the optical conversion layer.

12 Claims, 3 Drawing Sheets

(51) Int. Cl.
*F21V 8/00* (2006.01)
*C09K 11/02* (2006.01)
*F21V 9/16* (2006.01)
*B82Y 20/00* (2011.01)

(52) U.S. Cl.
CPC ............... *F21V 9/16* (2013.01); *G02B 6/005* (2013.01); *G02B 6/0026* (2013.01); *G02F 1/133621* (2013.01); *B82Y 20/00* (2013.01); *G02F 2001/133614* (2013.01); *G02F 2001/133624* (2013.01); *Y10S 977/774* (2013.01)

(58) Field of Classification Search
CPC ........ G02F 2001/133614; G02F 2001/133624; G02B 6/005; G02B 6/0026; B82Y 30/00; B82Y 20/00; C09K 11/02; F21V 9/16; Y10S 977/774
USPC .......................................................... 349/71
See application file for complete search history.

(56) References Cited

U.S. PATENT DOCUMENTS

| | | | |
|---|---|---|---|
| 9,110,204 | B2 | 8/2015 | Nakamura et al. |
| 9,239,418 | B2 | 1/2016 | Nakamura et al. |
| 2009/0267051 | A1 | 10/2009 | Kim et al. |
| 2012/0113672 | A1 | 5/2012 | Dubrow et al. |
| 2013/0038818 | A1 | 2/2013 | Toda et al. |
| 2013/0271700 | A1* | 10/2013 | Nakamura ........... G02B 6/0026 349/65 |
| 2015/0323726 | A1 | 11/2015 | Nakamura et al. |

FOREIGN PATENT DOCUMENTS

| | | |
|---|---|---|
| JP | 2013-037165 A | 2/2013 |
| JP | 2013-218953 A | 10/2013 |
| JP | 2013-539598 A | 10/2013 |
| NO | 2008/013959 A3 | 1/2008 |
| NO | 2013/046130 A1 | 4/2013 |
| WO | 2008/013959 A2 | 1/2008 |
| WO | 2012/021643 A2 | 2/2012 |
| WO | 2012/021643 A3 | 2/2012 |

OTHER PUBLICATIONS

Written Opinion issued in connection with International Patent Application No. PCT/JP2014/081503 dated Mar. 3, 2015.
Notification of Reasons for Refusal issued by the Japanese Patent Office dated Nov. 8, 2016, in connection with Japanese Patent Application No. 2013-246010.
International Preliminary Report on Patentability issued by WIPO dated Jun. 9, 2016, in connection with International Patent Application No. PCT/JP2014/081503.

* cited by examiner

OPTICAL CONVERSION MEMBER, BACKLIGHT UNIT, AND LIQUID CRYSTAL DISPLAY DEVICE

CROSS-REFERENCE TO RELATED APPLICATIONS

This application is a Continuation of PCT International Application No. PCT/JP2014/081503 filed on Nov. 28, 2014, which was published under PCT Article 21(2) in Japanese, and claims priority under 35 U.S.C §119(a) to Japanese Patent Application No. 2013-246010 filed on Nov. 28, 2013. The above applications are hereby expressly incorporated by reference, in their entirety, into the present application.

BACKGROUND OF THE INVENTION

1. Field of the Invention

The present invention relates to an optical conversion member and a method for manufacturing the optical conversion member, and specifically, relates to an optical conversion member which is able to exhibit high light emission efficiency for a long period of time and a method for manufacturing the optical conversion member.

Further, the present invention relates to a backlight unit including the optical conversion member, and a liquid crystal display device including the backlight unit.

2. Description of the Related Art

A flat panel display such as a liquid crystal display device (hereinafter, also referred to as LCD) has been widely used annually as a space saving image display device having low power consumption. The liquid crystal display device is configured of at least a backlight and a liquid crystal cell, and typically, includes members such as a backlight side polarizing plate and a visible side polarizing plate.

In the flat panel display market, improvements in color reproducibility has progressed as LCD performance has improved. In this point, recently, a quantum dot (also referred to as QD) has attracted attention as a light emission material (refer to US2012/0113672A1). For example, in a case where excitation light is incident on an optical conversion member containing a quantum dot from a backlight, the quantum dot is excited and emits fluorescent light. Here, by using the quantum dots having different light emission properties, white light is able to be embodied by emitting each bright line light of red light, green light, and blue light. The fluorescent light of the quantum dot has a small half-width, and thus, the obtained white light has a high brightness and an excellent color reproducibility. According to the progress of three-wavelength light source technology using such a quantum dot, a color reproduction range has widened to 100% from 72% of the current TV standard (Full High Definition (FHD)), National Television System Committee (NTSC)) ratio.

SUMMARY OF THE INVENTION

In the quantum dot, light emission efficiency decreases due to a photooxidization reaction in a case where the quantum dot is in contact with oxygen. In this point, in US2012/0113672A1, it has been proposed that a barrier layer is laminated on a film containing a quantum dot in order to protect the quantum dot from oxygen or the like. However, as a result of study of the present inventors, it has been found that a decrease over time in the light emission efficiency of the quantum dot may not be sufficiently suppressed by only disposing the barrier layer.

Therefore, an object of the present invention is to provide an optical conversion member containing a quantum dot, in which high light emission efficiency is able to be exhibited for a long period of time.

The present inventors have conducted studies in order to attain the object described above, and have considered that the reason that the decrease over time in the light emission efficiency of the quantum dot is not able to be sufficiently suppressed by only disposing the barrier layer is due to an adhesion failure between a quantum dot-containing layer and the barrier layer. More specifically, it is assumed that a void is generated on a boundary surface between both layers due to the adhesion failure or because oxygen penetrates from the end portion of the boundary surface on which sufficient adhesion is not obtained, and thus, the quantum dot is in contact with oxygen in spite of the presence of the barrier layer, and the light emission efficiency decreases. As a result of intensive studies, it has been newly found that polyorganosilsesquioxane is used as a matrix of the quantum dot-containing layer, and an inorganic layer is disposed as the barrier layer adjacent to the quantum dot-containing layer, and thus, it is possible to obtain an optical conversion member which is able to exhibit high light emission efficiency (high weather fastness) for a long period of time.

To further describe this point, the polyorganosilsesquioxane is a siloxane polymer having a Si—O bond in a main skeleton, has a structure denoted by a composition formula $[XSiO_{3/2}]_a$ (X represents a substituent group, and a represents the number of repeating units), a silicon atom is bonded to three oxygen atoms in the main skeleton, and oxygen is bonded to two silicon atoms. As it is obvious from the composition formula, the polyorganosilsesquioxane is an intermediate substance between inorganic silica $SiO_2$ and organic silicone $(R_2SiO)_a$.

On the other hand, in the optical conversion member containing the quantum dot, typically, the quantum dot is dispersed in an organic layer (an organic matrix) containing a resin as a main component.

The present inventors have focused on the point described above, and have found that the polyorganosilsesquioxane which exhibits properties as an organic compound and an inorganic substance is used as the organic matrix of the quantum dot-containing layer, and the inorganic layer is disposed as the barrier layer adjacent to the quantum dot-containing layer, and thus, it is possible to obtain the optical conversion member in which interlayer adhesiveness is able to be increased and excellent weather fastness is exhibited according to the high interlayer adhesiveness.

The present invention has been completed on the basis of the following findings.

One embodiment of the present invention relates to an optical conversion member comprising: an optical conversion layer containing a quantum dot emitting fluorescent light which is excited by incident excitation light, in which the optical conversion layer contains a quantum dot and polyorganosilsesquioxane, and an adjacent inorganic layer is directly in contact with the optical conversion layer.

In one embodiment, the optical conversion member includes the adjacent inorganic layer on both surfaces of the optical conversion layer.

In one embodiment, the adjacent inorganic layer is selected from the group consisting of an inorganic nitride layer and an inorganic oxide layer.

In one embodiment, the adjacent inorganic layer is a silicon-containing layer.

In one embodiment, the optical conversion layer is a cured material layer of a curable composition which contains a quantum dot and a polymerizable silsesquioxane compound.

In one embodiment, the polyorganosilsesquioxane has a basket type structure or an incomplete basket type structure.

In one embodiment, the quantum dot is at least one selected from the group consisting of a quantum dot A having a light emission center wavelength in a wavelength range of 600 nm to 680 nm, a quantum dot B having a light emission center wavelength in a wavelength range of 500 nm to 600 nm, and a quantum dot C having a light emission center wavelength in a wavelength range of 400 nm to 500 nm.

Another embodiment of the present invention relates to a backlight unit comprising at least the optical conversion member; and a light source.

In one embodiment, the backlight unit emits blue light which has a light emission center wavelength in a wavelength range of 430 nm to 480 nm and has a light emission intensity peak having a half-width of less than or equal to 100 nm, green light which has a light emission center wavelength in a wavelength range of 500 nm to 600 nm and has a light emission intensity peak having a half-width of less than or equal to 100 nm, and red light which has a light emission center wavelength in a wavelength range of 600 nm to 680 nm and has a light emission intensity peak having a half-width of less than or equal to 100 nm.

In one embodiment, the light source has a light emission center wavelength in a wavelength range of 430 nm to 480 nm.

In one embodiment, the backlight unit further includes a light guide plate, and the optical conversion member is disposed on a path of light exiting from the light guide plate.

In one embodiment, the backlight unit further includes a light guide plate, and the optical conversion member is disposed between the light guide plate and the light source.

Still another embodiment of the present invention relates to a liquid crystal display device comprising at least the backlight unit; and a liquid crystal cell.

Still another embodiment of the present invention relates to a method for manufacturing: the optical conversion member comprising forming the optical conversion layer; and forming the adjacent inorganic layer by performing vapor deposition with respect to an inorganic material.

In one embodiment, the optical conversion layer is formed by curing a curable composition containing a quantum dot and a polymerizable silsesquioxane compound.

According to the present invention, it is possible to provide an optical conversion member having a small decrease over time in light emission efficiency of a quantum dot, and a backlight unit and a liquid crystal display device including the optical conversion member.

DESCRIPTION OF THE PREFERRED EMBODIMENTS

[Optical Conversion Member and Method for Manufacturing the Same]

An optical conversion member according to one embodiment of the present invention is an optical conversion member including an optical conversion layer containing a quantum dot emitting fluorescent light which is excited by incident excitation light. The optical conversion layer described above contains a quantum dot and polyorganosilsesquioxane, and an adjacent inorganic layer is directly in contact with the optical conversion layer. Here, direct contact indicates that two layers are arranged to be adjacent to each other without including other layers such as an adhesive layer therebetween. The adjacent inorganic layer excellently exhibits a function as a barrier layer, and thus, it is possible to prevent a decrease in weather fastness of the optical conversion member due to deterioration of the quantum dot. As described above, this is because the polyorganosilsesquioxane configuring the organic matrix has properties as an organic compound and an inorganic substance, and contributes to the improvement in adhesiveness between the adjacent inorganic layer and the optical conversion layer.

Hereinafter, the optical conversion member will be described in more detail. Furthermore, the optical conversion member and the optical conversion layer are also able to be referred to as a wavelength conversion member and a wavelength conversion layer.

The following description is based on representative embodiments of the present invention, but the present invention is not limited to such embodiments. Furthermore, in the present invention and herein, a numerical range denoted by using "to" indicates a range including numerical values before and after "to" as the lower limit value and the upper limit value.

In addition, in the present invention and herein, a "half-width" of a peak indicates the width of a peak at a height of ½ of a peak height. In addition, light having a light emission center wavelength in a wavelength range of 400 nm to 500 nm, and preferably 430 nm to 480 nm will be referred to as blue light, light having a light emission center wavelength in a wavelength range of 500 nm to 600 nm will be referred to as green light, and light having a light emission center wavelength in a wavelength range of 600 nm to 680 nm will be referred to as red light.

It is preferable that the optical conversion member described above is included as a configuration member of a backlight unit of a liquid crystal display device.

Figure 1A:
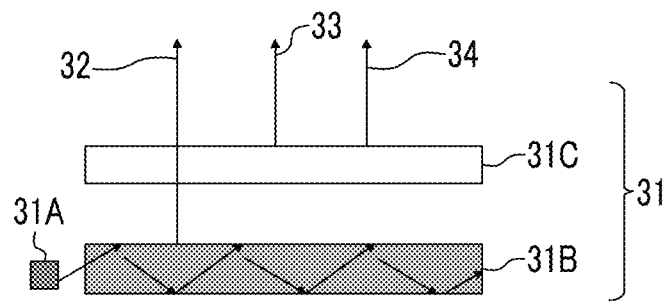
FIG. 1A and FIG. 1B are explanatory diagrams of an example of a backlight unit including an optical conversion member according to one embodiment of the present invention.
Figure 1B:
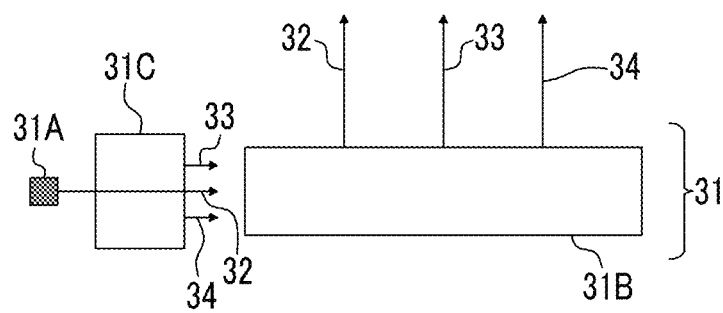

FIGS. 1A and 1B are explanatory diagrams of an example of a backlight unit 31 including an optical conversion member according to one embodiment of the present invention. In FIGS. 1A and 1B, the backlight unit 31 includes a light source 31A, and a light guide plate 31B for being used as a plane light source. In an example illustrated in FIG. 1A, the conversion member is arranged on a path of light exiting from the light guide plate. On the other hand, in an example illustrated in FIG. 1B, the optical conversion member is arranged between the light guide plate and the light source.

Then, in the example illustrated in FIG. 1A, light exiting from the light guide plate 31B is incident on an optical conversion member 31C. In the example illustrated in FIG. 1A, light 32 which exits from the light source 31A arranged on an edge portion of the light guide plate 31B is blue light, and exits towards a liquid crystal cell from the surface of the light guide plate 31B on the liquid crystal cell (not illustrated) side. The optical conversion member 31C arranged on the path of the light (the blue light 32) exiting from the light guide plate 31B contains at least a quantum dot A emitting red light 34 which is excited by the blue light 32 and a quantum dot B emitting green light 33 which is excited by the blue light 32. Thus, the excited green light 33 and the excited red light 34, and the blue light 32 transmitted through the optical conversion member 31C exit from the backlight unit 31. Thus, bright line light of RGB is emitted, and thus, it is possible to embody white light.

The example illustrated in FIG. 1B has the same embodiment as that illustrated in FIG. 1A except that the arrangement of the optical conversion member and the light guide plate is different. In the example illustrated in FIG. 1B, the excited green light 33 and the excited red light 34, and the blue light 32 transmitted through the optical conversion member 31C exit from the optical conversion member 31C and are incident on the light guide plate, and thus, the plane light source is realized.

(Optical Conversion Layer)

The optical conversion member includes at least the optical conversion layer containing the quantum dot emitting fluorescent light which is excited by incident excitation light. The optical conversion member according to one embodiment of the present invention includes an inorganic layer (an adjacent inorganic layer) which is directly in contact with the optical conversion layer as other essential layers. The details will be described below.

The optical conversion layer contains at least one type of quantum dot, and is also able to contain two or more types of quantum dots having different light emission properties. A known quantum dot includes a quantum dot A having a light emission center wavelength in a wavelength range of 600 nm to 680 nm, a quantum dot B having a light emission center wavelength in a wavelength range of 500 nm to 600 nm, and a quantum dot C having a light emission center wavelength in a wavelength range of 400 nm to 500 nm, and the quantum dot A emits red light which is excited by excitation light, the quantum dot B emits green light, and the quantum dot C emits blue light. For example, in a case where the blue light is incident as excitation light to the optical conversion layer containing the quantum dot A and the quantum dot B, as illustrated in FIGS. 1A and 1B, it is possible to embody the white light by the red light emitted from the quantum dot A, the green light emitted from the quantum dot B, and the blue light transmitted through the optical conversion layer. Alternatively, ultraviolet light is incident on the optical conversion layer containing the quantum dots A, B, and C as excitation light, and thus, it is possible to embody the white light by the red light emitted from the quantum dot A, the green light emitted from the quantum dot B, and the blue light emitted from the quantum dot C. The quantum dot, for example, can be referred to the description disclosed in paragraphs [0060] to [0066] of JP2012-169271A, but is not limited to the description. A commercially available product is able to be used as the quantum dot without any limitation. In general, the light emission wavelength of the quantum dot is able to be adjusted according to the composition of particles, the size of particles, and the composition and the size. The optical conversion layer may contain quantum dots having different light emission properties in the same layer (a quantum dot mixed layer), or may have a structure in which two or more layers (single quantum dot layers) respectively containing quantum dots having different light emission properties are laminated.

The shape of the optical conversion layer is not particularly limited, and the optical conversion layer is able to have an arbitrary shape such as a sheet-like shape or a film-like shape, and a bar-like shape. The sheet-like or film-like optical conversion layer is preferable from the viewpoint of reducing the thickness of the backlight unit and the liquid crystal display device in which the optical conversion layer is incorporated.

The optical conversion layer of the optical conversion member according to one embodiment of the present invention contains the quantum dot in polyorganosilsesquioxane which is an organic matrix. In one embodiment, a coating liquid containing the quantum dot and the polyorganosilsesquioxane is applied by a known coating method such as a spin coating method, and is dried, and thus, it is possible to obtain the optical conversion layer containing the quantum dot and the polyorganosilsesquioxane. In addition, in another embodiment, the optical conversion layer is a cured material layer in which a curable composition containing the quantum dot and a polymerizable silsesquioxane compound is polymerized and cured by light irradiation or the like.

The polyorganosilsesquioxane and the polymerizable silsesquioxane compound are able to have a structure denoted by General Formula (1) described below:

$$[RSiO_{3/2}]_n \quad (1)$$

It has been known that the polyorganosilsesquioxane has a basket type structure which is a completely closed polyhedron structure, an incomplete basket type (basket type cleavage) structure in which a part of the polyhedron is cleaved, a ladder-type structure, a random-type structure, and the like. The polyorganosilsesquioxane having a basket type structure is able to be denoted by General Formula (1) described above. In General Formula (1), R represents a substituent group, a plurality of R's may be identical to each other or different from each other, and n represents 8, 10, or 12. A compound in which at least one of the plurality of R's is an organic functional group having a polymerizable group is the polymerizable silsesquioxane compound.

The polymerizable group of the polymerizable silsesquioxane compound is not particularly limited insofar as the polymerizable group is a functional group which is able to be subjected to a polymerization reaction by heating or light irradiation, and examples of the polymerizable group are able to include a (meth)acryloyl group, a glycidyl group, a vinyl group, a styryl group, and an oxetane group. The (meth)acryloyl group and the styryl group are preferable, and the (meth)acryloyl group is more preferable. Here, the (meth)acryloyl group is used as the concept including an acryloyl group and a methacryloyl group. The same applies to "(meth)acrylate" described below. Examples of the organic functional group having a (meth)acryloyl group are able to preferably include a (meth)acryloyl oxy alkyl group having 1 to 3 carbon atoms denoted by General Formula (2) described below.

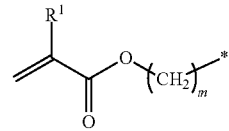

(2)

In General Formula (2), * represents a bonding position with respect to a silicon atom configuring a main skeleton, $R^1$ represents a hydrogen atom or a methyl group, and m represents an integer in a range of 1 to 3. Furthermore, General Formula (2) is also able to be denoted as $CH_2=CR^1-COO-(CH_2)m-$. Preferred specific examples of the organic functional group denoted by General Formula (2) include a 3-methacryloxy propyl group, a methacryloxy methyl group, and a 3-acryloxy propyl group.

In the substituent group represented by R, one or more of the plurality of R's are able to be a non-polymerizable group. Examples of the non-polymerizable group are able to include an alkyl group and an aryl group, and a methyl group and a phenyl group are preferable.

Specific examples of the polyorganosilsesquioxane having a basket type structure are able to include polyorganosilsesquioxane denoted by General Formulas (3) to (5) described below. In General Formulas (3) to (5), R is identical to R in General Formula (1).

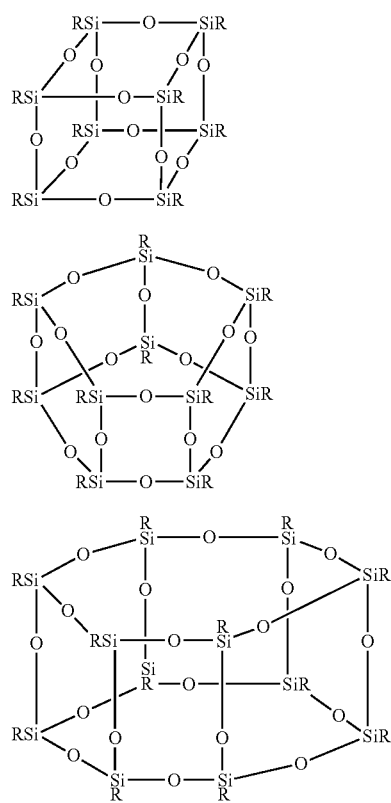

In addition, specific examples of the polyorganosilsesquioxane having an incomplete basket type structure in which a part of the basket type structure is cleaved are able to include polyorganosilsesquioxane denoted by General Formula (6) described below.

$[RSiO_{3/2}]_n-[R'SiO_{1/2}]_{n'}$ (6)

In General Formula (6), R and n are respectively identical to R and n in General Formula (1). R' represents a substituent group, and the details thereof are identical to those of R. n' represents 0, 2, 4, or 6. The details of the polyorganosilsesquioxane denoted by General Formula (6) can be referred to the description disclosed in JP2012-218322A, and specifically, can be referred to the description disclosed in paragraphs [0011], [0012], [0019] to [0021] and examples of JP2012-218322A.

The details of the polyorganosilsesquioxane and the polymerizable silsesquioxane compound described above can be referred to the description disclosed in each publication of JP4142385B, JP4409397B, JP5078269B, JP4920513B, JP4964748B, JP5036060B, JP4558643B, JP2010-96848A, JP2011-194647A, JP2012-183818A, JP2012-184371A, and JP2012-218322A, and the contents disclosed in these publications are incorporated in the present invention.

The polyorganosilsesquioxane and the polymerizable silsesquioxane compound are able to be manufactured by a known method, for example, methods disclosed in the publications described above. Preferred examples of a manufacturing method are able to include a method disclosed in paragraphs [0025] to [0036] of JP2010-96848A.

The polyorganosilsesquioxane which is the matrix of the optical conversion layer may be one type of polyorganosilsesquioxane, or may be two or more types of polyorganosilsesquioxanes having different structures. All of the polyorganosilsesquioxanes configuring the matrix may have a basket type structure or an incomplete basket type structure, or the polyorganosilsesquioxane may be a mixture of polyorganosilsesquioxane having a structure of a basket type structure or an incomplete basket type structure and polyorganosilsesquioxane having a non-basket type structure. Here, the non-basket type structure indicates a structure other than the basket type structure and the incomplete basket type structure. In a case where the polyorganosilsesquioxane is the mixture of the polyorganosilsesquioxane having a basket type structure or an incomplete basket type structure and the polyorganosilsesquioxane having a non-basket type structure, it is preferable that a ratio of the polyorganosilsesquioxane having a basket type structure or an incomplete basket type structure is high, and it is more preferable that the ratio of the polyorganosilsesquioxane having a structure selected from the group consisting of a basket type structure and an incomplete basket type structure is 60 mass % to 95 mass %, and the residues have a non-basket type structure.

Preferably, the optical conversion layer is prepared by applying the curable composition containing the quantum dot and the polymerizable silsesquioxane compound onto a substrate, and then, by performing a curing treatment with respect to the curable composition. The curing treatment is able to be performed by light irradiation, heating, or the like according to the type of polymerizable compound to be used. The optical conversion layer which is obtained through the polymerization of the polymerizable silsesquioxane compound has a high hardness and small aging bleed out of a component configuring the layer, and tends to enable excellent durability to be exhibited, compared to an optical conversion layer formed by using non-polymerizable polyorganosiloxane.

The curable composition for forming the optical conversion layer is able to contain other polymerizable compounds in addition to the polymerizable silsesquioxane compound or other than the polymerizable silsesquioxane compound. The other polymerizable compound is not particularly limited. In a case where the polymerizable silsesquioxane compound and the other polymerizable compound are used together, it is preferable that the polymerizable silsesquioxane compound and the other polymerizable compound form a covalent bond, and thus, fluidity of the silsesquioxane compound is reduced from the viewpoint of suppressing bleed out. From this viewpoint, it is preferable that the polymerizable silsesquioxane compound and the other polymerizable compound have the same polymerizable group. In addition, a (meth)acrylate compound such as a monofunctional or multifunctional (meth)acrylate monomer, a polymer thereof, a prepolymer thereof, and the like are preferable as the other polymerizable compound, from the viewpoint of transparency, adhesiveness, or the like of a cured film after being cured. Furthermore, in the present invention and herein, the "(meth)acrylate" is used as the concept including at least one of acrylate or methacrylate, or any one of acrylate and methacrylate. The same applies to "(meth)acryloyl" or the like. The content ratio of the polymerizable silsesquioxane compound is preferably greater than or equal to 1 mass % and less than or equal to 70 mass %, is more preferably greater than or equal to 1 mass % and less than or equal to 60 mass %, and is most preferably greater than or equal to 1 mass % and less than or equal to 50 mass %, with respect to the total amount of the curable composition. In addition, it is preferable that the total content of the polymerizable compound is approximately 10 mass % to 99.99 mass % with respect to the total amount of the curable composition.

Examples of the monofunctional (meth)acrylate monomer are able to include an acrylic acid and a methacrylic acid, and a derivative thereof, and more specifically, a monomer having one polymerizable unsaturated bond of a (meth)acrylic acid (one (meth)acryloyl group) in the molecules. Specific examples thereof can be referred to the description disclosed in paragraph [0022] of WO2012/077807A1.

A multifunctional (meth)acrylate monomer having two or more (meth)acryloyl groups in the molecules is able to be used along with a monomer having one polymerizable unsaturated bond of the (meth)acrylic acid (one (meth)acryloyl group) in one molecule. The details thereof can be referred to the description disclosed in paragraph [0024] of WO2012/077807A1. In addition, a multifunctional (meth)acrylate compound disclosed in paragraphs [0023] to [0036] of JP2013-043382A is able to be used as the multifunctional (meth)acrylate compound. Further, an alkyl chain-containing (meth)acrylate monomer denoted by General Formulas (4) to (6) disclosed in paragraphs [0014] to [0017] of the specification of JP5129458B is also able to be used.

The use amount of the multifunctional (meth)acrylate monomer is preferably greater than or equal to 5 parts by mass, from the viewpoint of strength of a coating film, and is preferably less than or equal to 95 parts by mass from the viewpoint of suppressing gelation of the composition, with respect to 100 parts by mass of the total amount of the polymerizable compound contained in the polymerizable composition. In addition, from the same viewpoint, it is preferable that the use amount of the monofunctional (meth)acrylate monomer is greater than or equal to 5 parts by mass and less than or equal to 95 parts by mass, with respect to 100 parts by mass of the total amount of the polymerizable compound contained in the polymerizable composition.

The curable composition described above is able to contain a known radical initiator as a polymerization initiator. The polymerization initiator, for example, can be referred to the description disclosed in paragraph [0037] of JP2013-043382A. The amount of polymerization initiator is preferably greater than or equal to 0.1 mol %, and is more preferably 0.5 mol % to 5 mol %, with respect to the total amount of the polymerizable compound contained in the curable composition.

The quantum dot may be added in a state of the particles of the curable composition, or may be added in a state of a dispersion in which the quantum dot is dispersed in a solvent. Adding the quantum dot in a state of the dispersion is preferable from the viewpoint of suppressing aggregation of the particles of the quantum dot. Here, a solvent to be used is not particularly limited. The added amount of the quantum dot, for example, is able to be approximately 0.1 parts by mass to 10 parts by mass, with respect to 100 parts by mass of the total amount of the composition.

The curable composition containing the quantum dot described above is applied onto a suitable support and is dried, and a solvent is removed, and then, the curable composition is polymerized and cured by light irradiation or the like, and thus, the optical conversion layer is able to be obtained. On the other hand, in a case where the curing treatment is not performed in the formation of the optical conversion layer, a composition for forming an optical conversion layer is applied onto a suitable support and is dried, and a solvent is removed, and thus, an optical conversion layer is able to be obtained. Examples of a coating method include a known coating method such as a curtain coating method, a dip coating method, a spin coating method, a printing coating method, a spray coating method, a slot coating method, a roll coating method, a slide coating method, a blade coating method, a gravure coating method, and a wire bar method. In addition, curing conditions are able to be suitably set according to the type of polymerizable compound to be used or the composition of the polymerizable composition.

The total thickness of the optical conversion layer is preferably in a range of 1 μm to 500 μm, and is more preferably in a range of 100 μm to 400 μm. In addition, in a case where the optical conversion layer includes a plurality of single quantum dot layers or quantum dot mixed layers, the film thickness of one layer is preferably in a range of 1 μm to 300 μm, and is more preferably in a range of 10 μm to 250 μm.

(Adjacent Inorganic Layer)

The optical conversion member according to one embodiment of the present invention includes the inorganic layer as the adjacent layer which is directly in contact with the optical conversion layer. The inorganic layer formed of the inorganic material is suitable as a barrier layer for suppressing a photooxidization reaction of the quantum dot since barrier properties, in particular, oxygen barrier properties are excellent. However, in a case where adhesiveness between the optical conversion layer and the inorganic layer is low, a barrier function of the inorganic layer becomes insufficient, and thus, it is difficult to maintain weather fastness. In contrast, in the optical conversion member according to one embodiment of the present invention, high adhesiveness between the optical conversion layer containing the polysilsesquioxane as an organic matrix and the adjacent inorganic layer is exhibited, and thus, it is possible to obtain the optical conversion member exhibiting excellent weather fastness.

In the present invention, the "inorganic layer" is a layer containing an inorganic material as a main component, and is preferably a layer formed only of an inorganic material. In contrast, the organic layer is a layer containing an organic material as a main component, and is preferably a layer in which the content of the organic material is preferably greater than or equal to 50 mass %, is more preferably greater than or equal to 80 mass %, and is particularly preferably greater than or equal to 90 mass %.

The inorganic material configuring the inorganic layer is not particularly limited, and for example, metal, or various inorganic compounds such as an inorganic oxide, a nitride, and an oxynitride are able to be used as the inorganic material. Silicon, aluminum, magnesium, titanium, tin, indium, and cerium are preferable as an element configuring the inorganic material, and one type or two or more types thereof may be included. Specific examples of the inorganic compound are able to include silicon oxide, silicon oxynitride, aluminum oxide, magnesium oxide, titanium oxide, tin oxide, an indium oxide alloy, silicon nitride, aluminum nitride, and titanium nitride. In addition, a metal film, for example, an aluminum film, a silver film, a tin film, a chromium film, a nickel film, and a titanium film may be disposed as the inorganic layer.

Among the materials described above, a silicon-containing material is preferable, and the silicon nitride, the silicon oxide, or the silicon oxynitride is particularly preferable. The polyorganosilsesquioxane configuring the organic matrix of the optical conversion layer is the silicon-containing compound, and thus, affinity with respect to a silicon-containing material is particularly excellent, and adhesiveness between the optical conversion layer and the adjacent inorganic layer is able to be higher. In addition, in a case where the adhesiveness is excellent, it is possible to effectively fill the pin hole with the optical conversion layer even in a case where the inorganic layer includes a pin hole, and it is possible to further increase barrier properties.

Examples of a formation method of the inorganic layer include a vapor deposition method, or a liquid phase growth method such as plating or a sol-gel method. It is preferable that the inorganic layer is formed by the sol-gel method from the viewpoint of easily forming an inorganic layer of a comparatively thick film. The details of the inorganic layer, for example, can be referred to the description disclosed in paragraphs [0043] to [0045] of JP2007-290369A and paragraphs [0064] to [0068] of JP2005-096108A.

On the other hand, in order to further increase the adhesiveness between the optical conversion layer and the adjacent inorganic layer, it is preferable that the inorganic material is sedimented directly on the surface of the optical conversion layer by vapor deposition.

That is, one embodiment of the present invention relates to a method for manufacturing the optical conversion member described above including forming the optical conversion layer, and forming the adjacent inorganic layer by performing vapor deposition with respect to the inorganic material. As described above, it is preferable that the optical conversion layer is formed by performing a curing treatment with respect to the curable composition containing the polymerizable silsesquioxane compound.

Here, the vapor deposition of the present invention includes various film formation methods in which a film formation material is able to be sedimented on a surface to be vapor-deposited sediment by evaporation or scattering, and more specifically, includes a physical vapor deposition (PVD) method such as a vapor deposition method, a sputtering method, and an ion plating method, and various chemical vapor deposition (CVD) methods.

As described above, it is preferable that the adjacent inorganic layer is formed by vapor deposition. Specifically, examples of the vapor deposition include a physical vapor deposition method such as a vacuum vapor deposition method in which an inorganic material such as an inorganic oxide, an inorganic nitride, an inorganic oxynitride, and metal is heated and vapor-deposited on a substrate; an oxidation reaction vapor deposition method in which an inorganic material is used as a raw material, is oxidized by introducing oxygen gas, and is vapor-deposited on a substrate; a sputtering method in which an inorganic material is used as a target raw material, is sputtered by introducing argon gas and oxygen gas, and is vapor-deposited on a substrate; and an ion plating method in which an inorganic material is heated by a plasma beam generated by a plasma gun, and is vapor-deposited on a substrate, a plasma chemical vapor deposition method in which an organic silicon compound is used as a raw material in a case of forming a vapor deposition film of silicon, and the like.

In addition, the silicon oxide film is able to be formed by a low temperature plasma chemical vapor deposition method using an organic silicon compound as a raw material. Specifically, examples of the organic silicon compound include 1,1,3,3-tetramethyl disiloxane, hexamethyl disiloxane, vinyl trimethyl silane, hexamethyl disilane, methyl silane, dimethyl silane, trimethyl silane, diethyl silane, propyl silane, phenyl silane, vinyl triethoxy silane, tetramethoxy silane, phenyl triethoxy silane, methyl triethoxy silane, octamethyl cyclotetrasiloxane, and the like. In addition, among the organic silicon compounds described above, the tetramethoxy silane (TMOS) and the hexamethyl disiloxane (HMDSO) are preferably used. This is because these organic silicon compounds have excellent handleability or properties of a vapor deposition film.

The thickness of the adjacent inorganic layer which is directly in contact with the optical conversion layer is preferably in a range of 10 nm to 500 nm, is more preferably in a range of 10 nm to 300 nm, and is particularly preferably in a range of 10 nm to 150 nm. This is because it is possible to suppress reflection on the inorganic layer while realizing more excellent barrier properties, and it is possible to provide an optical conversion member having higher light transmittance by setting the film thickness of the adjacent inorganic layer to be in the range described above.

In one embodiment, the composition for forming an optical conversion layer is applied onto the inorganic layer formed on the substrate and is dried, and as necessary, is subjected to a curing treatment, and thus, it is possible to form a laminated structure of the adjacent inorganic layer and the optical conversion layer. In addition, in another embodiment, the inorganic layer is formed directly on the optical conversion layer, and thus, the laminated structure of the adjacent inorganic layer and the optical conversion layer is able to be formed. Alternatively, the optical conversion layer is able to be bonded to the adjacent inorganic layer by lamination. The lamination for bonding the adjacent inorganic layer to the optical conversion layer is performed by heating and pressurizing (thermal pressure bonding) in a state where the surface of the optical conversion layer is directly in contact with the surface of the inorganic layer without using an adhesive agent.

(Other Inorganic Layers and Organic Layers)

The optical conversion member described above is able to include one or more layers selected from the group consisting of an inorganic layer and an organic layer on the surface of the adjacent inorganic layer on a side opposite to the surface which is directly in contact with the optical conversion layer. In addition, optical conversion member described above is able to include one or more layers selected from the group consisting of an inorganic layer and an organic layer on the surface of the optical conversion layer on a side opposite to the surface which is directly in contact with the adjacent inorganic layer. Thus, laminating a plurality of layers is preferable from the viewpoint of improving weather fastness since it is possible to further increase barrier properties. On the other hand, light transmittance of the optical conversion member tends to decrease as the number of laminated layers increases, and thus, it is desirable that the number of laminated layers increases in a range where excellent light transmittance is able to be maintained. Specifically, in the optical conversion member, it is preferable that the total light ray transmittance in a visible light region is greater than or equal to 90% and oxygen permeability is less than or equal to 0.01 $cm^3/(m^2 \cdot day)$. Here, the oxygen permeability described above is a value measured by using an oxygen gas permeability measurement device (OX-TRAN 2/20: Product Name, manufactured by MOCON Inc.) under conditions of a measurement temperature of 23° C. and relative humidity of 90%. In addition, the visible light region indicates a wavelength range of 380 nm to 780 nm, and the total light ray transmittance indicates the average value of the light transmittance excluding the contribution of light absorption and reflection of the optical conversion layer containing the quantum dot.

It is more preferable that the oxygen permeability is less than or equal to 0.001 $cm^3/(m^2 \cdot day)$. It is more preferable that the total light ray transmittance in the visible light region is greater than or equal to 95%. It is preferable that the oxygen permeability becomes lower, and it is preferable that the total light ray transmittance in the visible light region becomes higher.

The description of the inorganic layer disposed as the other layer is identical to the description of the adjacent inorganic layer. Furthermore, the inorganic layer disposed as the other layer is not necessarily limited to a layer which is directly in contact with the optical conversion layer. For example, the inorganic layer is able to be bonded to the optical conversion layer or other adjacent layers by an adhesive layer. It is preferable that the inorganic layer which is disposed as the other layer is also prepared as the adjacent inorganic layer from the viewpoint of further improving weather fastness.

The organic layer can be referred to the description disclosed in paragraphs [0020] to [0042] of JP2007-290369A and paragraphs [0074] to [0105] of JP2005-096108A. Furthermore, it is preferable that the organic layer contains a CARDO polymer. Accordingly, adhesiveness between the organic layer and the adjacent layer or the substrate (the details will be described below), and in particular, adhesiveness with respect to the inorganic layer become excellent, and thus, more excellent gas barrier properties are able to be realized. The details of the CARDO polymer can be referred to the description disclosed in paragraphs [0085] to [0095] of JP2005-096108A. The film thickness of the organic layer is preferably in a range of 0.05 μm to 10 μm, and is more preferably in a range of 0.5 μm to 10 μm. In a case where the organic layer is formed by a wet coating method, the film thickness of the organic layer is preferably in a range of 0.5 μm to 10 μm, and is more preferably in a range of 1 μm to 5 μm. In addition, in a case where the organic layer is formed by a dry coating method, the film thickness of the organic layer is preferably in a range of 0.05 μm to 5 μm, and is more preferably in a range of 0.05 μm to 1 μm. This is because it is possible to make the adhesiveness with respect to the inorganic layer more excellent by setting the film thickness of the organic layer which is formed by the wet coating method or the dry coating method to be in the range described above.

The other details of the inorganic layer and the organic layer having barrier properties can be referred to the description disclosed in JP2007-290369A, JP2005-096108A, and US2012/0113672A1 described above.

In addition, it is possible to form the adjacent inorganic layer on the substrate in order to improve strength and easily form a film. In addition, in a case where two or more layers selected from the group consisting of an organic layer and an inorganic layer which is able to function as the barrier layer are laminated, the substrate may exist between the layers. A transparent substrate which is transparent with respect to visible light is preferable as the substrate. Here, being transparent with respect to the visible light indicates that light ray transmittance in the visible light region is greater than or equal to 80%, and is preferably greater than or equal to 85%. The light ray transmittance which is used as the scale of transparency is able to be calculated by measuring the total light ray transmittance and the scattering light amount using a method disclosed in JIS-K7105, that is, an integrating sphere type light ray transmittance measurement device, and by subtracting scattering transmittance from the total light ray transmittance. The substrate can be referred to the description disclosed in paragraphs [0046] to [0052] of JP2007-290369A and paragraphs [0040] to [0055] of JP2005-096108A. The thickness of the substrate is preferably in a range of 10 μm to 500 μm, is more preferably in a range of 50 μm to 400 μm, and is particularly preferably in a range of 100 μm to 300 μm, from the viewpoint of gas barrier properties, impact resistance, and the like.

[Backlight Unit]

A backlight unit according to one embodiment of the present invention includes at least the optical conversion member described above, and a light source. The details of the optical conversion member are identical to those described above.

(Light Emission Wavelength of Backlight Unit)

It is preferable that a backlight unit which is a multi-wavelength light source is used as the backlight unit from the viewpoint of realizing a high brightness and a high color reproducibility. Preferred embodiments are able to include a backlight unit which emits blue light having a light emission center wavelength in a wavelength range of 430 nm to 480 nm and a light emission intensity peak having a half-width of less than or equal to 100 nm, green light having a light emission center wavelength in a wavelength range of 500 nm to 600 nm and a light emission intensity peak having a half-width of less than or equal to 100 nm, and red light having a light emission center wavelength in a wavelength range of 600 nm to 680 nm and a light emission intensity peak having a half-width of less than or equal to 100 nm.

The wavelength range of the blue light emitted from the backlight unit is preferably 450 nm to 480 nm, and is more preferably 460 nm to 470 nm, from the viewpoint of further improving brightness and color reproducibility.

The wavelength range of the green light emitted from the backlight unit is preferably 520 nm to 550 nm, and is more preferably 530 nm to 540 nm, from the same viewpoint.

In addition, the wavelength range of the red light emitted from the backlight unit is preferably 610 nm to 650 nm, and is more preferably 620 nm to 640 nm, from the same viewpoint.

All of the half-widths of the respective light emission intensities of the blue light, the green light, and the red light emitted from the backlight unit are preferably less than or equal to 80 nm, are more preferably less than or equal to 50 nm, are even more preferably less than or equal to 45 mn, are still more preferably less than or equal to 40 nm, from the same viewpoint. Among them, it is particularly preferable that the half-width of each of the light emission intensity of the blue light is less than or equal to 30 nm.

The backlight unit includes at least the light source along with the optical conversion member described above. In one embodiment, a light source which emits blue light having a light emission center wavelength in a wavelength range of 430 nm to 480 nm, for example, a blue emitting diode emitting blue light is able to be used as the light source. In a case where the light source emitting the blue light is used, it is preferable that the optical conversion layer contains at least the quantum dot A emitting the red light which is excited by excitation light and the quantum dot B emitting the green light. Accordingly, it is possible to embody the white light by the blue light which is emitted from the light source and is transmitted through the optical conversion member, and the red light and the green light emitted from the optical conversion member.

Alternatively, in another embodiment, a light source which emits ultraviolet light having a light emission center wavelength in a wavelength range of 300 nm to 430 nm, for example, an ultraviolet light emitting diode is able to be used as the light source. In this case, it is preferable that the optical conversion layer contains the quantum dot C emitting the blue light which is excited by excitation light along with the quantum dots A and B. Accordingly, it is possible to embody the white light by the red light, the green light, and the blue light emitted from the optical conversion member.

Alternatively, in another embodiment, two types of light sources selected from the group consisting of a blue laser emitting blue light, a green laser emitting green light, and a red laser emitting red light are used, and a quantum dot emitting fluorescent light having a light emission wavelength which is different from the light exiting from the light source is contained in the optical conversion layer, and thus, it is possible to embody the white light by two types of light rays emitted from the light source and light emitted from the quantum dot of the optical conversion layer.

(Configuration of Backlight Unit)

The configuration of the backlight unit may be an edge light mode in which a light guide plate, a reflection plate, or the like is included as a configuration member, or may be a direct backlight mode. In FIGS. 1A and 1B, an example of an edge light mode backlight unit is illustrated as one embodiment. A known light guide plate is able to be used as the light guide plate without any limitation.

In addition, the backlight unit is also able to include a reflection member in the rear portion of the light source. Such a reflection member is not particularly limited, but known reflection members disclosed in JP3416302B, JP3363565B, JP4091978B, JP3448626B, and the like are able to be used, and the contents of the publications are incorporated in the present invention.

It is also preferable that the backlight unit includes a wavelength selective filter for a blue color which selectively transmits light having a wavelength shorter than 460 nm in the blue light.

In addition, it is also preferable that the backlight unit includes a wavelength selective filter for a red color which selectively transmits light having a wavelength longer than 630 nm in the red light.

Such a wavelength selective filter for a blue color or a wavelength selective filter for a red color is not particularly limited, and a known wavelength selective filter is able to be used. Such a filter is disclosed in JP2008-52067A or the like, and the contents of the publication are incorporated in the present invention.

In addition, it is also preferable that the backlight unit includes a known diffusion plate or diffusion sheet, a known prism sheet (for example, BEF series or the like manufactured by Sumitomo 3M Ltd.), and a known light guide device. The other members are disclosed in each publication of JP3416302B, JP3363565B, JP4091978B, JP3448626B, and the like, and the contents of the publications are incorporated in the present invention.

[Liquid Crystal Display Device]

The liquid crystal display device according to one embodiment of the present invention includes at least the backlight unit described above, and a liquid crystal cell.

(Configuration of Liquid Crystal Display Device)

The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode are able to be used. It is preferable that the liquid crystal cell is in the VA mode, the OCB mode, the IPS mode, or the TN mode, but the liquid crystal cell is not limited thereto. The configuration illustrated in FIG. 2 of JP2008-262161A is exemplified as the configuration of the liquid crystal display device in the VA mode. However, the specific configuration of the liquid crystal display device is not particularly limited, and a known configuration is able to be adopted.

In one embodiment of the liquid crystal display device, the liquid crystal display device includes a liquid crystal cell in which a liquid crystal layer is interposed between facing substrates of which at least one includes an electrode, and the liquid crystal cell is configured by being arranged between two polarizing plates. The liquid crystal display device includes the liquid crystal cell in which a liquid crystal is sealed between upper and lower substrates, changes the alignment state of the liquid crystal by applying a voltage, and thus, displays an image. Further, as necessary, the liquid crystal display device includes an associated functional layer such as a polarizing plate protective film or an optical compensation member performing optical compensation, and an adhesive layer. In addition, a surface layer such as a forward scattering layer, a primer layer, an antistatic layer, and an undercoat layer may be arranged along with (or instead of) a color filter substrate, a thin layer transistor substrate, a lens film, a diffusion sheet, a hard coat layer, an anti-reflection layer, a low reflection layer, an antiglare layer, and the like.

Figure 2:
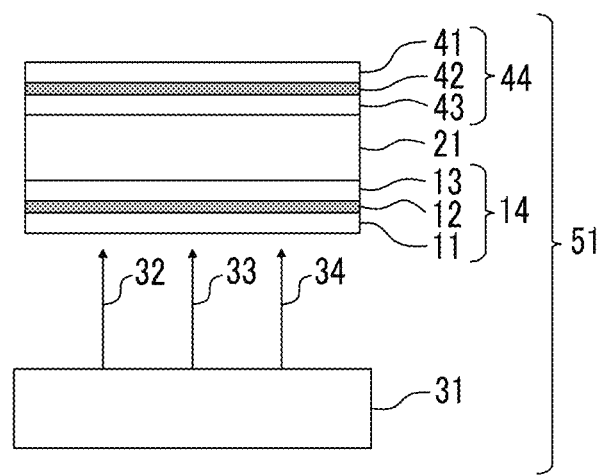
FIG. 2 illustrates an example of a liquid crystal display device according to one embodiment of the present invention.

FIG. 2 illustrates an example of the liquid crystal display device according to one embodiment of the present invention. A liquid crystal display device 51 illustrated in FIG. 2 includes a backlight side polarizing plate 14 on the surface of a liquid crystal cell 21 on the backlight side. The backlight side polarizing plate 14 may or may not including a polarizing plate protective film 11 on the surface of a backlight side polarizer 12 on the backlight side, and it is preferable that the backlight side polarizing plate 14 includes the polarizing plate protective film 11 on the surface of the backlight side polarizer 12 on the backlight side.

It is preferable that the backlight side polarizing plate 14 has a configuration in which the polarizer 12 is interposed between two polarizing plate protective films 11 and 13.

Herein, a polarizing plate protective film on a side close to the liquid crystal cell with respect to the polarizer indicates an inner side polarizing plate protective film, and a polarizing plate protective film on a side separated from the liquid crystal cell with respect to the polarizer indicates an outer side polarizing plate protective film. In an example illustrated in FIG. 2, the polarizing plate protective film 13 is the inner side polarizing plate protective film, and the polarizing plate protective film 11 is the outer side polarizing plate protective film.

The backlight side polarizing plate may include a retardation film as the inner side polarizing plate protective film on the liquid crystal cell side. A known cellulose acylate film or the like is able to be used as such a retardation film.

The liquid crystal display device 51 includes a display side polarizing plate 44 on the surface of the liquid crystal cell 21 on a side opposite to the surface on the backlight side. The display side polarizing plate 44 has a configuration in which a polarizer 42 is interposed between two polarizing plate protective films 41 and 43. The polarizing plate protective film 43 is the inner side polarizing plate protective film, and the polarizing plate protective film 41 is the outer side polarizing plate protective film.

The description of the backlight unit 31 of the liquid crystal display device 51 is identical to the description described above.

The liquid crystal cell, the polarizing plate, the polarizing plate protective film, and the like configuring the liquid crystal display device according to one embodiment of the present invention are not particularly limited, a member prepared by a known method or a commercially available product is able to be used without any limitation. In addition, a known interlayer such as an adhesive layer is also able to be disposed between the respective layers.

The liquid crystal display device according to one embodiment of the present invention described above includes the backlight unit including the optical conversion member which is able to exhibit excellent weather fastness, and thus, it is possible to realize a high brightness and a high color reproducibility for a long period of time.

EXAMPLES

Hereinafter, the characteristics of the present invention will be more specifically described with reference to examples. Materials, used amounts, ratios, treatment contents, treatment sequences, and the like of the following examples are able to be suitably changed unless the changes cause deviance from the gist of the present invention. Therefore, the range of the present invention will not be restrictively interpreted by the following specific examples.

I. Preparation of Optical Conversion Member

Example 1

(1) Preparation of Inorganic Vapor Deposition Film A

Polyethylene naphthalate (PEN) film (TEONEX (Registered Trademark) Q65FA manufactured by Teijin DuPont Films Japan Limited, a thickness of 100 μm, and a width of 1000 mm) was set in a sending out portion of a vacuum film formation device and was subjected to a vacuum evacuation, and then, an SiN film (a film thickness of 50 nm) was vapor-deposited on only one surface of a polyethylene naphthalate film by a CVD method as an inorganic layer (an inorganic layer A), and thus, a roll film of an inorganic vapor deposition film A in which the inorganic layer A was laminated on only one surface was prepared.

(2) Preparation of Optical Conversion Layer 1

A quantum dot dispersion A described below was prepared, was filtered through a polypropylene filter having a hole diameter of 0.2 μm, and then, was subjected to reduced pressure drying for 30 minutes, and thus, was used as a coating liquid. The prepared coating liquid was applied onto the surface of the inorganic layer A on which the inorganic vapor deposition film A was laminated, and then, was immobilized by being irradiated with an ultraviolet ray using an air-cooled metal halide lamp (manufactured by EYE GRAPHICS CO., LTD.) of 160 W/cm² under nitrogen, and thus, an optical conversion layer 1 was prepared directly on the inorganic layer A. Thus, a laminated body was obtained in which the inorganic layer A and the optical conversion layer 1 were directly laminated on the polyethylene naphthalate film. The film thickness of the laminated body was 280 μm.

| Composition for Optical Conversion Layer 1 Containing Quantum Dot | |
|---|---|
| Toluene Dispersion of Quantum Dot 1 (Maximum Light Emission: 530 nm) | 10 parts by mass |
| Toluene Dispersion of Quantum Dot 2 (Maximum Light Emission: 620 nm) | 1 part by mass |
| Lauryl Methacrylate | 2.5 parts by mass |
| Polymerizable Silsesquioxane S-1 Having Basket Type Structure | 0.54 parts by mass |
| Photopolymerization Initiator | 0.009 parts by mass (IRGACURE 819 (manufactured by BASF SE) |

Used materials are as follows.

Toluene Dispersion of Quantum Dot 1 InP530-10 (manufactured by NN-LABS, LLC.)

Toluene Dispersion of Quantum Dot 2 InP620-10 (manufactured by NN-LABS, LLC.)

Basket Type Silsesquioxane S-1: Silicone Resin Having Basket Type Structure as Main Component Disclosed in Example 1 of JP2010-96848A (3) Preparation of Optical Conversion Member 1

Figure 3:
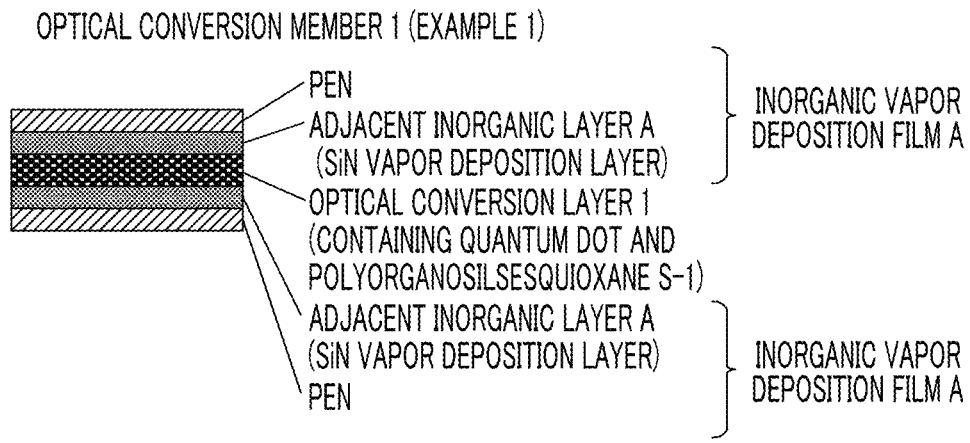
FIG. 3 illustrates a layer configuration of an optical conversion member of Example 1.

The laminated body prepared in (2) described above and the inorganic vapor deposition film A prepared by the same method as that in (1) were superposed such that the optical conversion layer 1 and the inorganic layer A were adjacent to each other, and were laminated (thermal pressure bonding) without using an adhesive agent, and thus, an optical conversion member 1 having a layer configuration illustrated in FIG. 3 including an adjacent inorganic layer on both surfaces of the optical conversion layer.

Examples 2 to 4

In the preparation of the optical conversion layer, optical conversion members 2 to 4 were prepared by the same method as that in Example 1 except that the polymerizable silsesquioxane having a basket type structure was changed to S-2 to S-4 (having a basket type structure or an incomplete basket type structure) described below, and thus, optical conversion layers 2 to 4 were prepared.

S-2: Silsesquioxane Oligomer Denoted by Structural Formula (6) Disclosed in Example 1 of JP2012-218322A S-3: Silsesquioxane Oligomer Denoted by Structural Formula (8) Disclosed in Example 4 of JP2012-218322A S-4: Silsesquioxane Oligomer Denoted by Structural Formula (9) Disclosed in Example 5 of JP2012-218322A Example 5

In the preparation of the inorganic vapor deposition film A, an $Al_2O_3$ film (a film thickness of 50 nm) was vapor-deposited on only one surface of the polyethylene naphthalate film by a CVD method as the inorganic layer (an inorganic layer B) instead of the SiN film, and thus, a roll film of an inorganic vapor deposition film B was prepared in which the inorganic layer B was laminated on only one surface.

Figure 4:
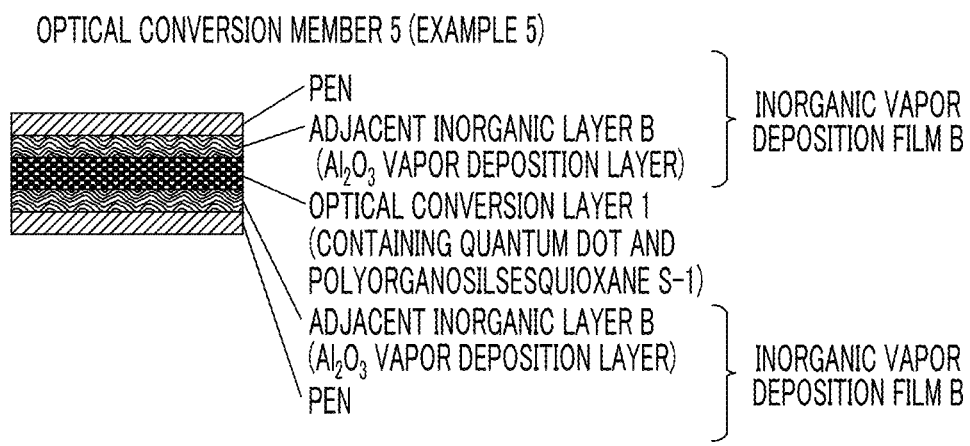
FIG. 4 illustrates a layer configuration of an optical conversion member of Example 5.

An optical conversion member 5 having a layer configuration illustrated in FIG. 4 was prepared by the same method as that in Example 1 except that the inorganic vapor deposition film A was changed to an inorganic vapor deposition film B was prepared.

Example 6

An optical conversion member 6 was prepared by the same method as that in Example 1 except that the polyorganosilsesquioxane used for forming the optical conversion layer was changed to non-polymerizable polyorganosilsesquioxane S-6 (PSS-Octamethyl substituted (manufactured by Sigma-Aldrich Corporation)), and thus, an optical conversion layer 6 was prepared.

Comparative Example 1

Figure 5:
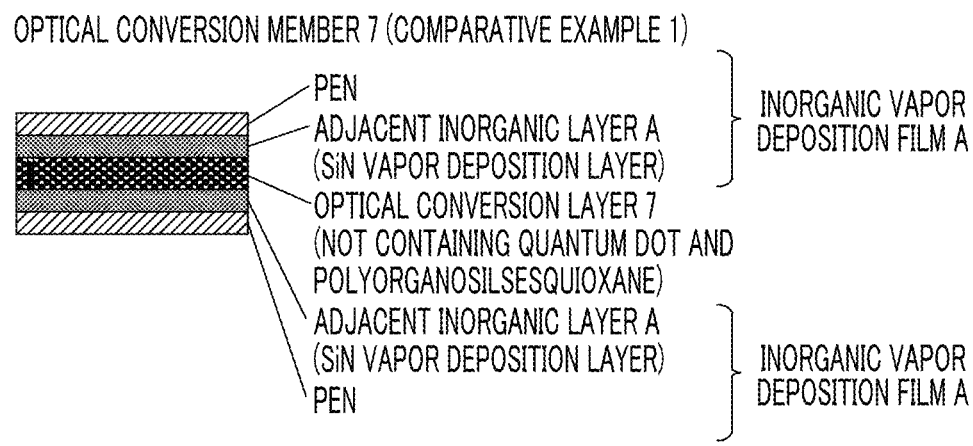
FIG. 5 illustrates a layer configuration of an optical conversion member of Comparative Example 1.

In the preparation of the optical conversion layer, an optical conversion member 7 having a layer configuration illustrated in FIG. 5 was prepared by the same method as that in Example 1 except that 0.54 parts by mass of the polyorganosilsesquioxane having a basket type structure was changed to 0.54 parts by mass of lauryl methacrylate, and thus, an optical conversion layer 7 was prepared.

II. Preparation of Liquid Crystal Display Device

A commercially available liquid crystal display device (Product Name: THL42D2, manufactured by Panasonic Corporation) was disassembled, each optical conversion member prepared in the examples and the comparative example was disposed on a light guide plate on which a liquid crystal cell was disposed, and a backlight unit was changed to a B narrowband backlight unit described below, and thus, a liquid crystal display device was manufactured. The used B narrowband backlight unit includes a blue light emitting diode (B-LED manufactured by NICHIA CORPORATION: Blue, a main wavelength of 465 nm, and a half-width of 20 nm) as a light source.

III. Evaluation of Optical Conversion Member

<Evaluation of Adhesiveness>

Evaluation was performed by a method based on JIS K5400. The surface of the inorganic vapor deposition film to which PEN film was attached was slit by a cutter knife at an interval of 1 mm and an angle of 90° with respect to a film surface, and thus, 100 crosscuts were prepared at an interval of 1 mm. MYLAR TAPE (manufactured by Nitto Denko Corporation, polyester tape, No. 31B) having a width of 2 cm was bonded to the surface of the inorganic vapor deposition film and was peeled off. The outermost layer was evaluated by the number of remaining cuts. The same test was performed with respect to both surfaces of the optical conversion member, and evaluation was performed by using the value of the surface on which the number of remaining cuts was small on the basis of the following evaluation criteria.

A: The number of remaining cuts is 100.
B: The number of remaining cuts is 99 to 60.
C: The number of remaining cuts is 59 to 20.
D: The number of remaining cuts is 19 to 0.

<Evaluation of Weather Fastness>

Weather fastness of the optical conversion member prepared in the examples and the comparative example was evaluated. In the weather fastness, a blue LED of 22 mW and 465 nm was used, a current of 20 mA was applied to this LED package, and the laminated body was continuously irradiated with light of the blue LED for 200 hours under the atmosphere, and thus, light emission efficiency of the optical conversion member after light irradiation was measured. The result was evaluated on the basis of the following criteria.

A: The light emission efficiency is greater than or equal to 80% compared to the light emission efficiency before light irradiation.
B: The light emission efficiency is greater than or equal to 60% and less than 80% compared to the light emission efficiency before light irradiation.
C: The light emission efficiency is greater than or equal to 40% and less than 60% compared to the light emission efficiency before light irradiation.
D: The light emission efficiency is less than 40% compared to the light emission efficiency before light irradiation.

IV. Evaluation of Optical Conversion Layer

<Evaluation of Pencil Hardness>

The optical conversion layers 1 to 4, and 6 prepared by the same method as that in Examples 1 to 4, and 6 were evaluated on the basis of the following criteria by measuring hardness of the surface of the optical conversion layer according to a pencil hardness test (based on JIS5600-5-4) in conditions of a load of 500 g.

A: Greater than or equal to 3H
B: Less than 3H

<Evaluation of Presence or Absence of Bleed Out>

The optical conversion member was left to stand on a hot plate at a temperature of 100° C. and under humidity of 50% RH for 100 hours, and then, the surface of the optical conversion member was visually observed and was observed by a microscope (observation magnification of 100 times), and thus, a case where a bleed-out material was observed was evaluated as A and a case where a bleed-out material was not observed was evaluated as B.

The results described above are shown in Table 1.

TABLE 1

| | Optical | | Adjacent | Evaluation of Optical Conversion Layer | | Evaluation of Optical Conversion Member | |
|---|---|---|---|---|---|---|---|
| | Conversion Layer | Polyorganosil-sesquioxane | Inorganic Layer | Pencil Hardness | Bleed Out | Adhesiveness | Weather Fastness |
| Example 1 | Optical Conversion Layer 1 | S-1 | SiN Layer | A | A | A | A |
| Example 2 | Optical Conversion Layer 2 | S-2 | SiN Layer | A | A | A | A |

TABLE 1-continued

|  | Optical Conversion Layer | Polyorganosil-sesquioxane | Adjacent Inorganic Layer | Evaluation of Optical Conversion Layer | | Evaluation of Optical Conversion Member | |
|---|---|---|---|---|---|---|---|
|  |  |  |  | Pencil Hardness | Bleed Out | Adhesiveness | Weather Fastness |
| Example 3 | Optical Conversion Layer 3 | S-3 | SiN Layer | A | A | A | A |
| Example 4 | Optical Conversion Layer 4 | S-4 | SiN Layer | A | A | A | A |
| Example 5 | Optical Conversion Layer 1 | S-1 | $Al_2O_3$ Layer | A | A | B | B |
| Example 6 | Optical Conversion Layer 6 | S-6 (Non-Polymerizable) | SiN Layer | B | B | A | A |
| Comparative Example 1 | Optical Conversion Layer 7 | — | SiN Layer | — | — | C | C |

Evaluation Result

As shown in Table 1, in the optical conversion members of Examples 1 to 6, a decrease in the light emission efficiency after light irradiation was small, and excellent weather fastness was exhibited compared to the optical conversion member of Comparative Example 1. This is because the inorganic layer is disposed as an adjacent layer of the optical conversion layer containing the polyorganosilsesquioxane as an organic matrix, and thus, it is possible to increase adhesiveness between the optical conversion layer and the inorganic layer, and the inorganic layer is able to excellently exhibit a function as a barrier layer.

In addition, it is considered that the reason that more excellent adhesiveness and weather fastness are obtained in the optical conversion members of Examples 1 to 4, and 6 in which the SiN layer is disposed as the adjacent inorganic layer of the optical conversion layer, compared to Example 5 is that the polyorganosiloxane has a high affinity with respect to a silicon-containing compound.

In addition, from the comparison of Examples 1 to 5 with Example 6, it is possible to confirm that the optical conversion layer formed through a curing treatment by using the polymerizable polyorganosilsesquioxane has a higher hardness than the optical conversion layer formed by using the non-polymerizable polyorganosilsesquioxane, and the occurrence of bleed-out is suppressed.

From the results described above, it has been found that an optical conversion member having excellent weather fastness, and a backlight unit and a liquid crystal display device including the optical conversion member are able to be provided according to the present invention.

INDUSTRIAL APPLICABILITY

The present invention is useful in a manufacturing field of a liquid crystal display device.

What is claimed is:

1. An optical conversion member, comprising:
   an optical conversion layer containing a quantum dot emitting fluorescent light which is excited by incident excitation light,
   wherein the optical conversion layer contains a quantum dot and polyorganosilsesquioxane,
   wherein an adjacent inorganic layer is directly in contact with the optical conversion layer, and
   wherein the optical conversion layer is a cured material layer of a curable composition which contains a quantum dot and a polymerizable silsesquioxane compound.

2. The optical conversion member according to claim 1, wherein the adjacent inorganic layer is disposed on both surfaces of the optical conversion layer.

3. The optical conversion member according to claim 1, wherein the adjacent inorganic layer is selected from the group consisting of an inorganic nitride layer and an inorganic oxide layer.

4. The optical conversion member according to claim 1, wherein the adjacent inorganic layer is a silicon-containing layer.

5. The optical conversion member according to claim 1, wherein the polyorganosilsesquioxane has a basket type structure or an incomplete basket type structure.

6. The optical conversion member according to claim 1, wherein the quantum dot is at least one selected from the group consisting of a quantum dot A having a light emission center wavelength in a wavelength range of 600 nm to 680 nm, a quantum dot B having a light emission center wavelength in a wavelength range of 500 nm to 600 nm, and a quantum dot C having a light emission center wavelength in a wavelength range of 400 nm to 500 nm.

7. A backlight unit, comprising at least:
   the optical conversion member according to claim 1; and
   a light source.

8. The backlight unit according to claim 7, which emits blue light which has a light emission center wavelength in a wavelength range of 430 nm to 480 nm and has a light emission intensity peak having a half-width of less than or equal to 100 nm, green light which has a light emission center wavelength in a wavelength range of 500 nm to 600 nm and has a light emission intensity peak having a half-width of less than or equal to 100 nm, and red light which has a light emission center wavelength in a wavelength range of 600 nm to 680 nm and has a light emission intensity peak having a half-width of less than or equal to 100 nm.

9. The backlight unit according to claim 7,
   wherein the light source has a light emission center wavelength in a wavelength range of 430 nm to 480 nm.

10. The backlight unit according to claim 7, further comprising:
a light guide plate,
wherein the optical conversion member is disposed on a path of light exiting from the light guide plate.

11. The backlight unit according to claim 7, further comprising:
a light guide plate,
wherein the optical conversion member is disposed between the light guide plate and the light source.

12. A liquid crystal display device, comprising at least:
the backlight unit according to claim 7; and
a liquid crystal cell.

\* \* \* \* \*